United States Patent [19]

Bauge et al.

[11] Patent Number: 4,856,000
[45] Date of Patent: Aug. 8, 1989

[54] DUPLICATED CIRCUIT ARRANGEMENT FOR FAST TRANSMISSION AND REPAIRABILITY

[75] Inventors: Michel Bauge, Lesigny; Gerard Boudon, Mennecy; Pierre Mollier, Boissise le Roi; Jean-Luc Peter, Champcueil, all of France; Yiannis J. Yamour, New York, N.Y.

[73] Assignee: International Business Machines Corporation, Armonk, N.Y.

[21] Appl. No.: 96,569

[22] Filed: Sep. 8, 1987

[30] Foreign Application Priority Data

Dec. 30, 1986 [FR] France .............................. 86430056

[51] Int. Cl.$^4$ .............................................. G06F 15/16
[52] U.S. Cl. ......................................... 371/9; 364/200
[58] Field of Search ......................... 371/9, 11, 12, 16; 364/200 MS File, 900 MS File

[56] References Cited

U.S. PATENT DOCUMENTS

| | | | |
|---|---|---|---|
| 3,395,396 | 7/1968 | Pasterak | 364/900 |
| 4,071,890 | 1/1978 | Pandeya | 364/200 |
| 4,099,234 | 7/1978 | Woods et al. | 371/9 |
| 4,270,167 | 5/1981 | Koehler et al. | 364/200 |
| 4,351,025 | 9/1982 | Hall, Jr. | 364/200 |
| 4,484,264 | 11/1984 | Friedli et al. | 364/200 |
| 4,486,826 | 12/1984 | Wolff et al. | 364/200 |

FOREIGN PATENT DOCUMENTS

| | | |
|---|---|---|
| 0076655 | 9/1982 | European Pat. Off. |
| 3334792 | 11/1984 | Fed. Rep. of Germany ......... 371/9 |
| 2139435 | 6/1971 | France |
| 2114721 | 1/1972 | France |
| 2371734 | 11/1976 | France |

OTHER PUBLICATIONS

"On-Chip Tristate Driver" by Schettler et al., IBM Technical Disclosure Bulletin, vol. 25, No. 5, 10/1982, p. 2347-2348.

Primary Examiner—A. D. Pellinen
Assistant Examiner—Geoffrey S. Evans
Attorney, Agent, or Firm—William T. Ellis

[57] ABSTRACT

Duplicated circuit arrangement comprising a main processor (30) and its P bit data bus (44), and two identical redundant devices (21:22), each device is comprised of a processing element (23;35) performing the same task in parallel on a P bits word, and send/receive circuits (24,25;36,37) controlled by the main processor through lines (SR11 to SR22) to transmit said word to and from said main processor. For each device, the send/receive circuits are split into two parts. Send/receive circuit of the first device (21) is split in two parts (24, 25); the first part (24) handles the P/2 Most Significant Bits (MSB's) and the second part (25) handles the P/2 Less Significant Bits (LSB's). In normal operation, during the transmission step, only the first part (24) is allowed to send bits on one half (33) of the data bus (44). Symmetrically send/receive circuit of the second device (22), is also split in two parts (36, 37); the first section (36) handles the P/2 Most Significant bits (MSB's) and the second part (37) handles the P/2 Less Significant Bits Z(LSB's); only the second part (37) is allowed to send bits on the other half (34) of the data bus (44). Therefore, the data bus driving effort is equally shared between the two devices, the maximum number of simultaneous switching is P/2 for each device. This reduction allows greater transmission speed on large busses.

13 Claims, 3 Drawing Sheets

DUPLICATED CIRCUIT ARRANGEMENT FOR FAST TRANSMISSION AND REPAIRABILITY

BACKGROUND OF THE INVENTION

1. Field of Invention

The present invention relates to the transmission of digital data signals on electrical busses and more particularly to an improved duplicated circuit arrangement wherein the number of simultaneous switches in the redundant devices is significantly reduced. In addition, according to the invention, it is possible to select only the operative sections of said devices to continue processing.

2. Description of the Prior Art

On the one hand, circuit duplication is a method often used to detect failures in systems where a high confidence level in failure detection is required. In accordance with such a method, two identical processing elements perform the same operations on the same data, their results are continuously compared, and a failure is detected if they do not match.

On the other hand, it is also well known that the data transmission rate between chips or modules on electrical busses is restricted by certain limitations related to the maximum number of simultaneously switching output drivers allowed. These limitations are due to voltage or current noise induced into the voltage distribution and signal lines when output drivers are simultaneously driving a large number of data bus lines. Known solutions are accompanied by heavy penalties in terms of packaging development and cost: complex voltage distribution, complicated line drivers and receivers, reduced bus width, as well as in terms of machine speed because it results in slower signal transmission due to the necessity of using controlled delayed transients in order to avoid the said phenomena of simultaneous switching.

FIG. 1 illustrates a known circuit arrangement of the prior art referenced 1 in the drawing, which embodies duplicated hardware. It will be used to set forth the problems raised by the simultaneous switching of output drivers when a duplicated circuit is implemented in a system. It is assumed that devices 2 and 3 are identical and therefore perform the same operation (when not defective) under the control of the main processor 4. Devices 2 and 3 may be for example, the floating point co-processor chip described in an article entitled: "Custom floating point chip designed with a cohesive structured method" by B. Desrosiers et al, published in the proceedings of the IEEE International Conference on Computer Design: VLSI in Computers ICCD'86 pp 402–405. The person skilled in the art will find in this article all the technical background to implement the present invention, such as clock distribution, sequencing, etc. In FIG. 1, device 2 is considered the master and device 3, the slave. Each device (2;3) is comprised of a processing element (5;6), working on a P bit word, for example, thirty six bits or four bytes, a send/receive circuit (7;8) and a compare circuit (9;10) respectively. An example of an appropriate processing element is shown in FIG. 1 of the above mentioned article.

Send/receive circuits 7 and 8 assure transmission of the four bytes (thirty two bits of data plus four parity bits) to and from the main data bus 11 of main processor 4, through bidirectional busses 12 and 13 respectively. Busses 12 and 13 are referenced to the device data bus, to be distinguished from the main processor data bus, referenced to the main data bus. However, it is to be noted that send/receive circuit 8 functionally operates only as a receiver in normal operation. Send/receive circuits 7 and 8 also assure bidirectional transmission of the P bit word to and from processing elements 5 and 6 on, busses 14 and 15 respectively.

Send/receive circuits 7 and 8 are comprised of a plurality of basic units, one per bit. Each unit is constituted of a separate output driver and receiver, having the output of the driver and the input of the receiver forming a common node connected to a line of the bus. Standard three state drivers and receivers are used for that application. An on-chip tristate driver is depicted in an article of the IBM Technical Disclosure Bulletin Vol. 25, No. 5, Oct. 1982, pages 2347–2348. The high impedance state of the drivers forming parts of send/receive circuits 7 and 8 is under the control of main processor 4 through control (inhibit) lines SR1 and SR2.

Compare circuit 9, which compares the bytes available on bus 14A after processing in processing element 5 with the bytes available on bus 14B, received from bus 12, is of no real utility in normal operation in the sense that it is not used to compare the validity of data after processing in the two processing elements, but it is of some interest since it may check the integrity of the send/receive circuit (drivers and receivers). Bus 14A is a unidirectional bus which connects the outputs of processing element 5 to the inputs of the drivers of send/receive circuits 7. Bus 14B is a unidirectional bus which connects the inputs of processing element 5 to the outputs of receivers of send/receive circuit 7. Busses 14A and 14B form the internal bus 14 of device 2. Compare circuit 10 compares the bytes processed by processing element 6 available on bus 15A with bytes received from device 2 and available on bus 15B. Bus 15A is a unidirectional bus which connects the outputs of processing element 6 to the inputs of drivers of send/receive circuit 8. Bus 15B is a unidirectional bus which connects the inputs of processing element 6 to the outputs of the receivers of send/receive circuit 8. Busses 16A and 15B form the internal bus 15 of device 3. The output of compare circuit 10 at node 16 provides the check out (CHKOUT) bit on line 17 for the main processor 4.

When all the drivers are not inhibited, the corresponding send/receive circuit is said to be in the SEND mode, and so is the corresponding device.

When all the drivers are inhibited, they are in the high impedance state, the corresponding send/receive circuit is said to be in the RECEIVE mode, and so is the corresponding device.

The operation takes place in three steps:

(a) Main processor 4 sets send/receive circuits 7 and 8 of devices 2 and 3 respectively to the RECEIVE mode through lines SR1 and SR2, and sends them data through busses 11, 12 and 13.

(b) Both processing elements 5 and 6 of devices 2 and 3 respectively process the data.

(c) Main processor 4 sets send/receive circuit 7 of device 2 to the SEND mode and send/receive circuit 8 of device 3 to the RECEIVE mode. When settled in the RECEIVE mode during this step, the send/receive circuit will also allow the compare function. This operating mode of the send/receive circuit will be referenced as the RECEIVE/COMPARE mode. This particular step is called the TRANSMISSION step. Send- /receive circuit 7 of device 2 transmits the processed data to the main processor 4 and to device 3 through busses 11 and 12. Compare circuit 10 of device 3 compares its own internal results available on bus 15A with the data received from device 2 available on bus 15B and sends the comparison result to the main processor via output node 16 and line 17. The output of compare circuit 9 is available at node 18 and line 19, but has the limited use mentioned in the above operation.

Therefore, in normal operation, device 3 (the slave) is used only for checking purposes while device 2 (the master) assures the data exchange with the main processor 4.

However, in case of mismatch the main processor stops the task in progress and starts a diagnostic routine to determine which one of the two devices (in fact which processing element) is the failing one. The good device is then switched to operate as the master while the failing one is disabled (output drivers forced into the high impedance state). Processing can then continue in a degraded operation without the previous checking capability until repair.

There is no means of selecting the operative sections of the processing elements of any devices while maintaining some checking capability.

The duplicated circuit arrangement of two redundant devices shown in FIG. 1, has still another, but primary, disadvantage: device 2 may be an integrated semiconductor chip or an electronic module and during the TRANSMISSION step where bits are transmitted on data bus 12, it may happen that a majority, if not all the P (e.g. thirty six) drivers forming the emitting portion of the send/receive circuit 7, may switch simultaneously, therefore producing the above-mentioned undesirable noise effects.

To date, the only known way of reducing that phenomenon of simultaneous switching is to properly use controlled delayed transients at the cost of an important reduction of the data transmission speed.

A 4 byte wide bidirectional data bus 11 has been chosen to illustrate this invention but any other configuration can be used: unidirectional busses or busses of different width.

As new semiconductor technologies arise, there is a continuous effort in developing circuits and applications involving both redundant devices, wide data busses (such as handling 64 or 128 bits) and operating at very high frequency. As a result, there is still an obvious need for an improved circuit arrangement of two redundant devices alleviating all the problems related to the simultaneous switching of output drivers mentioned above.

OBJECTS OF THE INVENTION

Therefore it is a primary object of the present invention to provide an improved circuit arrangement of redundant devices wherein each of the interconnected redundant devices exhibits reduced simultaneous switching for speed improvement and packaging cost reduction.

It is another object of the present invention to provide an improved circuit arrangement of redundant devices which allows the selection of the operative sections of the processing elements of any interconnected redundant devices to provide a good overall functioning of the system and a high level of reliability and repairability.

It is still a further object of the present invention to provide an improved circuit arrangement of redundant devices which during a degraded operation allows the only operative device to continue processing by itself when the others have fully failed.

SUMMARY OF THE INVENTION

According to its most general principle, there is provided an improved circuit arrangement including a plurality of redundant devices for data transmission wherein the driving function of the redundant devices on the data bus is shared between said devices. Preferably, the driving function is equally shared between the N devices to divide by a factor N the maximum number of simultaneous switches for each device. As a result, this significantly improves the data transmission speed on said data bus.

According to that general principle, there is provided an improved circuit arrangement of redundant devices, including a main processor provided with a P bit data bus, N redundant devices; each of which device includes a processing element, processing a P bit word or frame and receiving means connected between the outputs of the processing element and the lines of the device data bus, the latter being mounted in parallel with said P bit main data bus. Driving means controlled by the main processor are provided to at least two of the N redundant devices to share the driving effort on the P bit main data bus between them so that they each transmit only a part of the P bit word, while the latter is wholly available on said P bit data bus.

In other words, if the processing elements are handling a frame or a word of P bits, the word is split into a series of consecutive sets or segments of bits, each corresponding to a particular section of the processing element; each device will emit only its own set of P/N bits on the data bus of the main processor. For example, the first device emits the first set of bits ranking from 1 to I, the second device emits the second set of bits ranking from I+1 to J, ... and the Nth device emits the last set of bits ranking from K+1 to P. However any device may emit any set of bits, it is only necessary that each set of bits is emitted once and the P bit word is emitted in integrality. As a result, the maximum number of simultaneous switching for each device is divided by N, and is now equal to P/N.

According to a first preferred embodiment, said driving means comprises at least one group of drivers dedicated to a particular section of the processing element.

According to another preferred embodiment, said driving means comprises one group of drivers dedicated to any section of the processing element and multiplexes, to properly orient the content of the appropriate section of the processing element to be sent.

However, the most common case is when hardware duplication is used (N=2).

BRIEF DESCRIPTION OF THE DRAWINGS

The objects and features of the present invention will become more apparent after considering the following detailed description taken in conjunction with the accompanying drawings in which.

DETAILED DESCRIPTION OF THE PREFERRED EMBODIMENTS

According to the basic principle of the invention an improved circuit arrangement of N redundant devices which allows an increased information transmission rate is provided. Preferably, the driving function on the data bus is equally shared between said devices. As a result, the maximum number of simultaneous switching for each device is divided by N.

Because the most simple case is hardware duplication (N=2), it has been chosen for illustration purposes. The invention is based on the fact that the devices always perform the same operations when they are not defective. Sharing the bus driving effort between the two devices alleviates the simultaneous switching constraints and improves the system "cost X performance" product.

Figure 2:
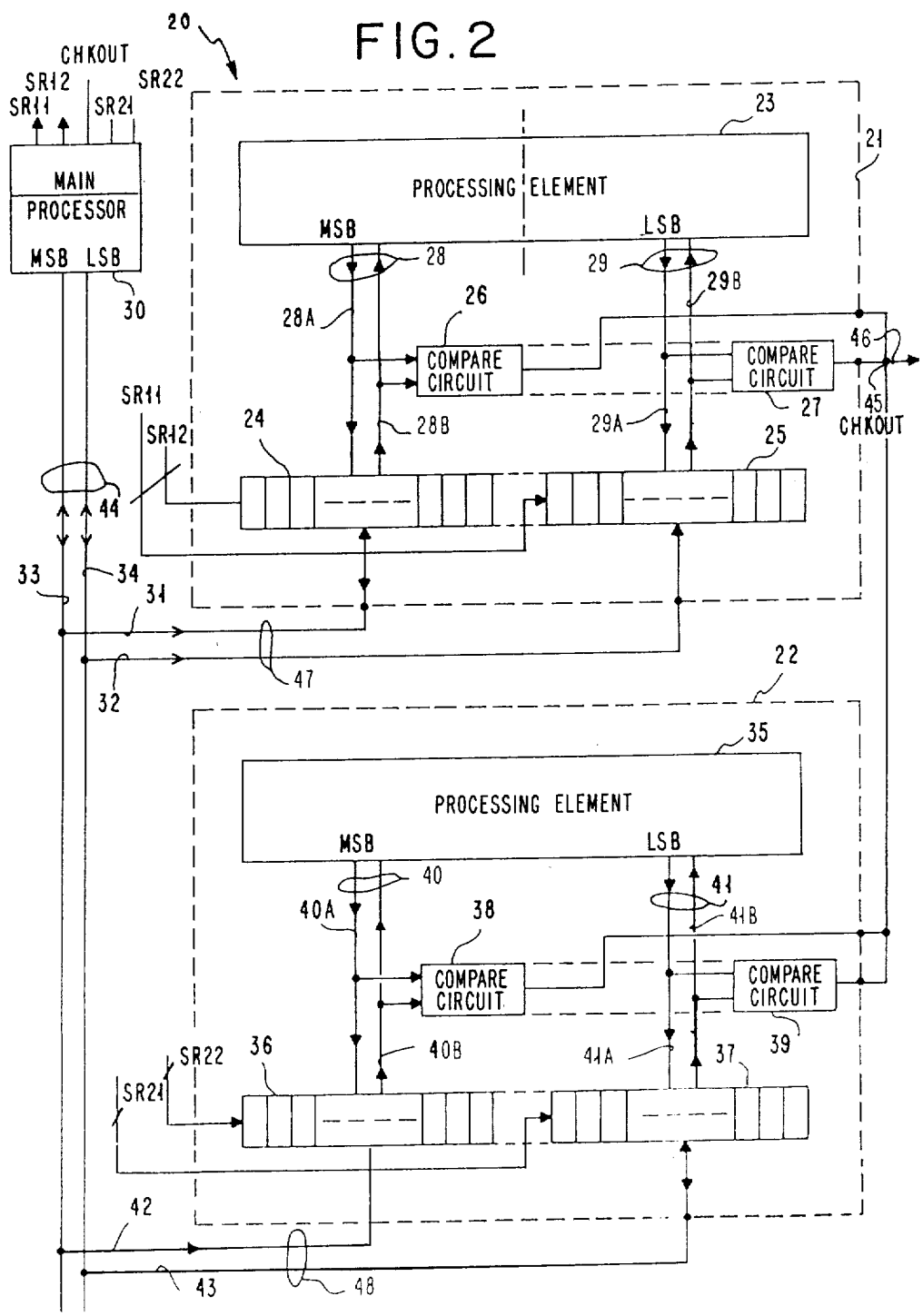
FIG. 2 shows an improvement to the duplicated circuit arrangement of FIG. 1 in accordance with the present invention, wherein said simultaneous switching problem is significantly reduced, and the selection of the operative sections of any redundant device is allowed.

The improved duplicated circuit arrangement according to the present invention, is referenced 20 in FIG. 2. Arrangement 20 is basically comprised of devices 21 and 22 which are assumed to be identical. Device 21 includes a processing element 23 working on a P bit word, for example six bits or four bytes, two send/receive circuits 24 and 25, and two compare circuits 26 and 27 (which may be either on or off chip but preferably on chip to limit external switchings). Processing element 23 is considered to be comprised of two sections, each of P/2 bits. The MSB section handles the MSB's (Most Significant Bits) and the LSB section handles the LSB's (Less Significant Bits). Send/receive circuits 24 and 25 assure transmission of the MSB's and LSB's to and from processing element 23 on busses 28 and 29 respectively, and assure a bidirectional transmission with the main processor 30 respectively, via busses 31 and 32 which are connected in parallel with busses 33 and 34 of the main processor 30. In others words, for device 21, send/receive circuit 24 handles the Most Significant Bits (MSB's), and send/receive circuit 25 handles the Less Significant Bits (LSB's). The same operation applies for device 22.

Similarly device 22 includes a processing element 35 working also on four bytes, two send/receive circuits 36 and 37, and two compare circuits 38 and 39.

Send/receive circuits 36 and 37 assure transmission of the MSB's and LSB's to and from processing element 35 on busses 40 and 41 respectively and assure a bidirectional transmission with the main processor 30, respectively via busses 42 and 43 which are connected in parallel with busses 33 and 34 of the main processor. Busses 33 and 34 constitute the data bus 44 of the main processor.

Compare circuit 27 compares the LSB's generated by processing element 23 and available on bus 29A with LSB's processed by processing element 35 and available on bus 29B at the output of send/receive circuit 25. Compare circuit 26 has no real utility as long as device 21 properly functions. Similarly, compare circuit 38 compares the MSB's generated by processing element 35 and available on bus 40A with MSB's generated by processing element 23 and available on bus 40B at the output of send/receive circuit 36. The outputs of all compare circuits are AND dotted at node 45 and provide the CHKOUT bit on line 46 for the main processor 30. Compare circuit 39, like compare circuit 26 is of no utility in this particular configuration but could be used in others. Send/receive circuits are operating in either one of two modes: RECEIVE or SEND, under the control of the main processor 30 through control lines SR 11, SR 12, SR 21 and SR 22. If necessary, the main processor may also receive the parity bits from the parity bit generator (not shown). Busses 31 and 32 constitute data bus 47 of device 21 and busses 42 and 43 constitute data bus 48 of device 22.

Figure 1:
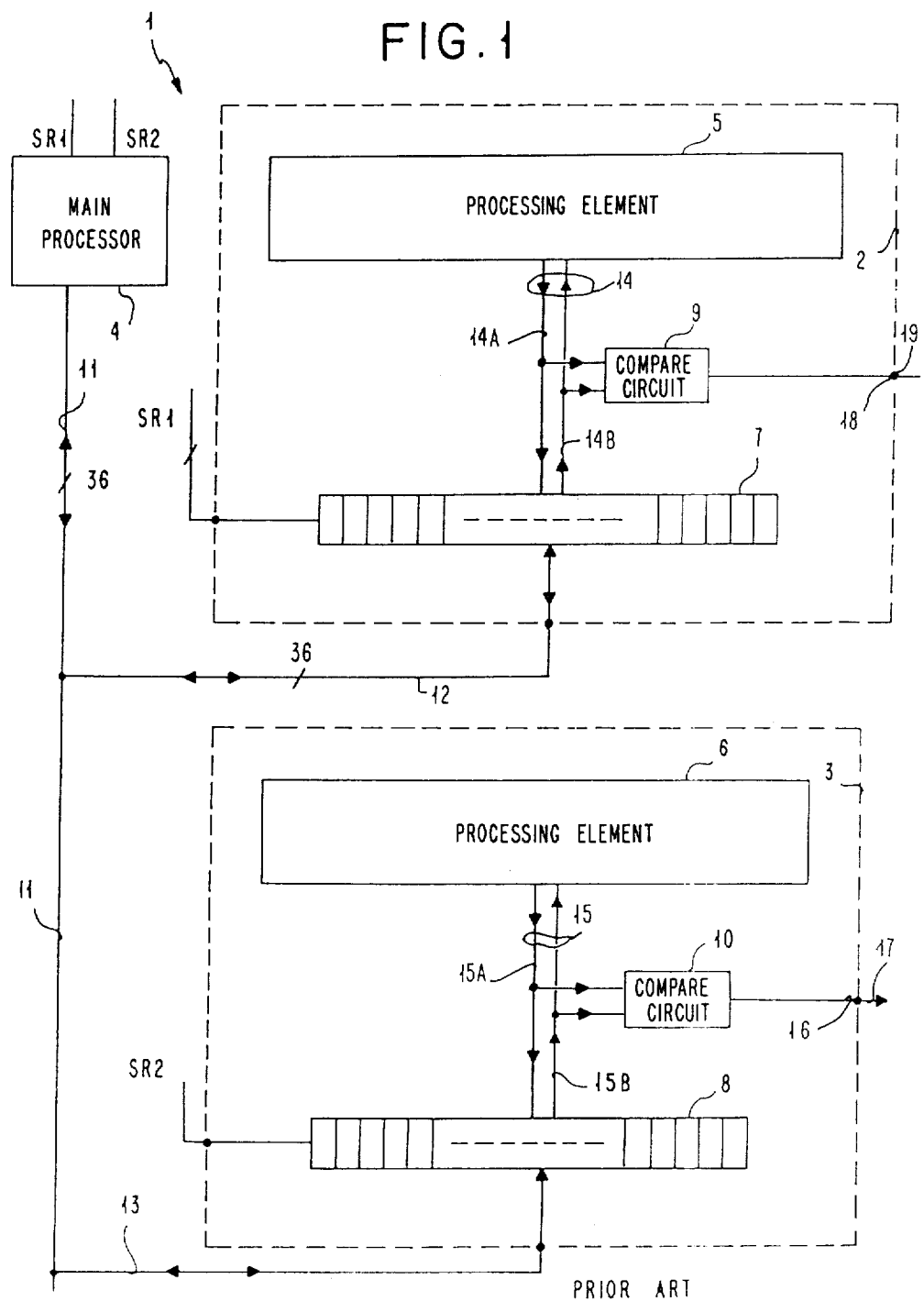
FIG. 1 shows a duplicated circuit arrangement of the prior art, according to which, one of the redundant devices is used only for check purposes, the other having a maximum sensitivity to the simultaneous switching problems.

Thus, FIG. 2 clearly shows how the concept of the present invention can be applied to the known duplicated circuit arrangement described above with respect to FIG. 1. For each device, the original send/receive and compare circuits of FIG. 1 have been split into two parts corresponding to two sections of the processing element identified as MSB and LSB sections. The send/receive control lines have been doubled in order to allow separate controls on MSB's and LSB's of both devices via SR11, SR12, SR21, and SR22. Both devices 21 and 22 are each comprised of two identical halves each corresponding to a determined section of the processing element.

The improved duplicated circuit arrangement of FIG. 2 operates as follows:

(a) Main processor sets send/receive circuits 24 and 25 of device 21 and send/receive circuits 36 and 37 of device 22 to RECEIVE mode, and sends them the data to be processed.

(b) Processing elements 23 and 35 process the data (e.g. a 4 byte word).

(c) Main processor 30 sets the send/receive circuit 24 of device 21 and send/receive circuit 37 of device 22 to SEND mode; conversely, it sets send/receive circuit 25 of device 21 and send/receive circuit 36 of device 22 to RECEIVE mode. Because, when set in the RECEIVE mode in this step, the send/receive circuit will also allow the compare function, this mode will be referenced as the RECEIVE/COMPARE mode. During this step, device 21 sends MSB's to main processor 30 and to device 22, and compares its own LSB's with LSB's received from device 22. Simultaneously, device 22 sends LSB's to main processor 30 and to device 21, and compares its own MSB's with MSB's received from device 21.

This particular operation characterizes the TRANSMISSION step where each device sends its own set of bits (e.g. MSB's for device 21 and LSB's for device 22), to the main processor, and half of each device 21 and 22 operates in different modes. For device 21, the first half (which handles the MSB's ) is in the SEND mode while the other half (which handles the LSB's ) is in the RECEIVE/COMPARE mode. For device 22, the first half is in the RECEIVE/COMPARE mode while the other half is in the SEND mode. All of these elementary consecutive sets are reassembled to form the complete set of P bits on the data bus (e.g. 44).

According to a first aspect of the invention, there is a significant reduction of the maximum number of simultaneous switches. This number, either for device 21 or for device 22, is now equal to P/2, for instance, eighteen in the present example compared to thirty six for device 2 in the example depicted in FIG. 1. It is clear that the driving function now equally shared between the two devices allows that reduction.

According to another aspect of the invention for better reliability and repairability, there is also an opportunity for the main processor to appropriately select the good section of either device to reconstruct a functionally operating device, when one device has a failure on one section, as it will be detailed hereafter.

If a mismatch is detected by any one of the two compare circuits 27 and 38, a fault signal is sent to main processor 30 via node 45 on line 46. Main processor 30 stops the task in progress and starts a diagnosis routine to identify which one of the two processing element 23 and 35 is defective, and then which section of it is defective (MSB or LSB). Then it takes corrective actions to reconfigure the task according to the diagnostic results.

If only one section of a processing element is defective, the defective half of the device is disabled. The corresponding output drivers are set in the high impedance state and the corresponding compare circuit is inhibited and thus by forcing its output at a high impedance state, it avoids invalidation of the CHKOUT bit. This defective half is in a particular variant of the RECEIVE mode, so called HIGH IMPEDANCE mode to distinguish from the RECEIVE/COMPARE mode. The other half is set to the SEND mode. The additional set of bits is provided to the main processor by the other device. Processing can continue at the same data rate but checking is lost on half of the bits.

If both sections of a processing element of device are defective, said device is fully disabled by forcing all the drivers of the send/receive circuits in the high impedance state and by inhibiting the compare circuits if so desired. Processing continues with the other device at reduced speed and with no checking at all. The device is said to operate in the HIGH IMPEDANCE mode. In this mode, the main processor cannot test the CHKOUT bit because it is permanently invalid. The system is now operating in the so called "degraded operation". Speed must be reduced because of simultaneous switching constraints as explained above. This can be done as known in the art, by staggering the SEND commands of MSB's with respect to LSB's or by generating two gating signals internally to the device, starting from a unique clock signal. For instance, the pulse position shift can simply be a cycle time, thus dividing the data rate by two, or can be adjusted to the minimal amount imposed by the technology wiring rules. In this last case the performance loss is minimized but clocking circuitry may be more complex.

TABLE 1 shows the tasks allocated by the main processor 30 to devices 21 and 22 through the different operating modes of device halves during the TRANSMISSION step, depending on which section of the processing element (P.E.) the failure is located.

TABLE 1

| DEVICE 21 | | DEVICE 22 | | |
|---|---|---|---|---|
| 1st half MSB Sect. mode | 2nd half LSB Sect. mode | 1st half MSB Sect. mode | 2nd half LSB Sect. mode | |
| G | G | G | G | |
| S(1) | R/C | R/C | S | No fail |
| F | G | G | G | |
| HI | S | S | R/C | |
| G | F | G | G | |
| S | HI | R/C | S | |
| | | | | half P.E. fail |
| G | G | F | G | |

TABLE 1-continued

| DEVICE 21 | | DEVICE 22 | | |
|---|---|---|---|---|
| 1st half MSB Sect. mode | 2nd half LSB Sect. mode | 1st half MSB Sect. mode | 2nd half LSB Sect. mode | |
| S | R/C | HI | S | |
| G | G | G | F | |
| R/C | S | S | HI | |
| F | | G | G | |
| | F | | | |
| | HI | S | S | full P.E. fail (degraded operation) |
| G | G | F | F | |
| S | S | | HI | |

Legend:
F = Fail
G = Good
S = SEND mode
R/C = RECEIVE/COMPARE mode
HI = HIGH IMPEDANCE mode (1) Note that during the TRANSMISSION step, the corresponding compare circuit (e.g. 26) of an operative half, e.g. 21 in the SEND mode, checks the validity of the transmitted bits (because in the SEND mode the receivers are still operative).

However, as it may be understood from FIG. 2 and TABLE 1, the design of devices 21 and 22 may be simplified in some respects, if it is acceptable to limit the system capabilities (in some cases such a limitation may be unacceptable for the system designer). In such a particular embodiment, device 21 only sends data via bus 31 and device 22 only sends data via bus 43 to the main processor. Each device needs compare circuitry for two bytes only (P/2 bits). Compare circuits 26 and 39 may be eliminated if so desired. In addition, half of the send/receive circuits operate only in the RECEIVE/COMPARE mode during the TRANSMISSION step. As a result, relatively complex send/receive comprised of both drivers and receivers units may be simply replaced by standard receivers. As a result a significant saving in silicon area may be gained for devices 21 and 22. It is well known that drivers are room consuming; also saving a total of P drivers equally shared between the two identical devices, is very is advantageous. In addition, according to that particular embodiment, all the combinatorial logic circuitry necessary to implement the compare circuits 26 and 39 is also saved. But this is done at the cost of eliminating the ability of selecting the operative sections of devices 21 and 22, which may be unacceptable.

However, the same result may be attained without sacrificing the system capabilities as: mentioned above but at the minor cost of adding extra multiplexers. Such two way multiplexers are very small circuits. The new implementation will be shown in FIG. 3.

Figure 3:
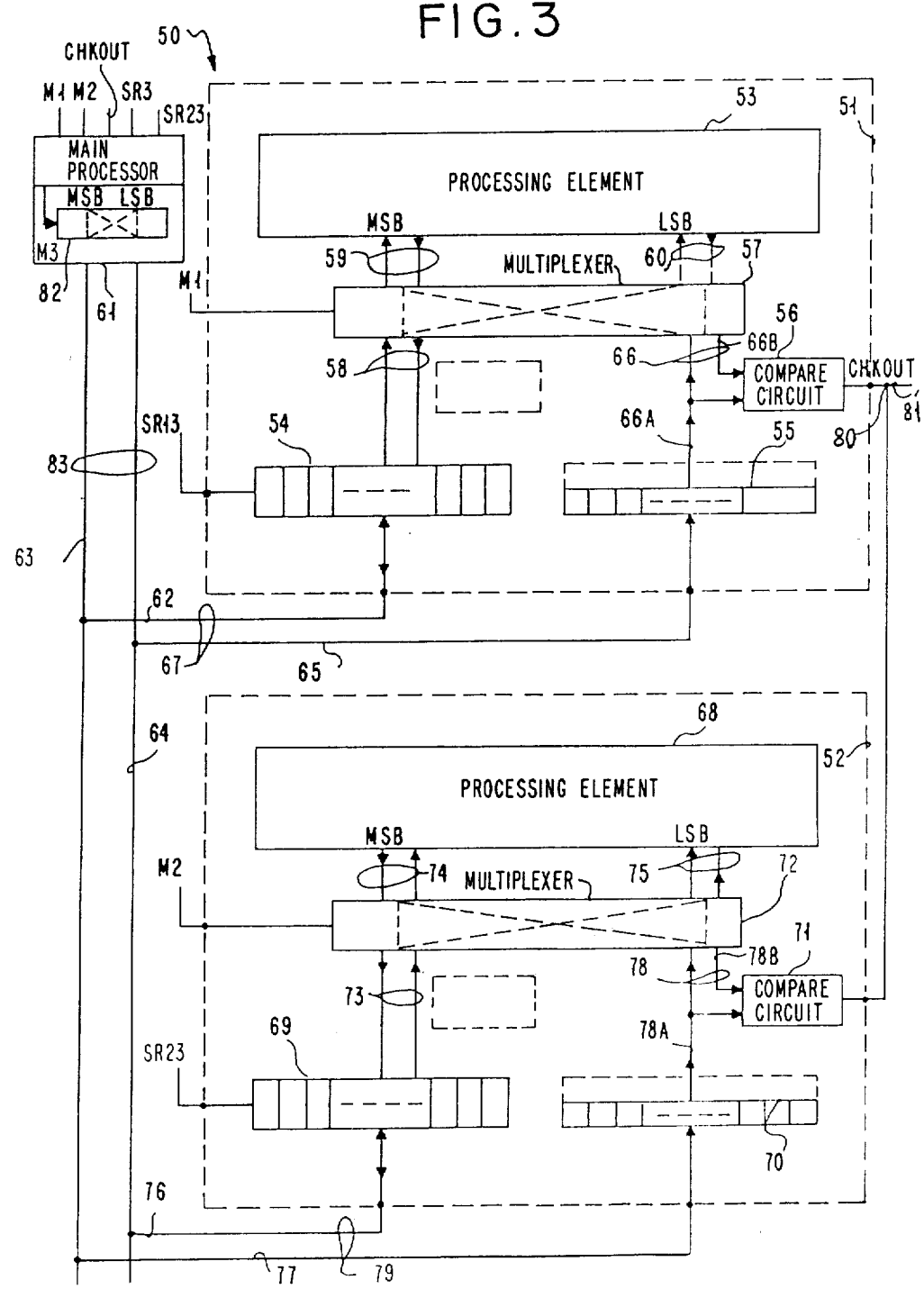
FIG. 3 shows an alternative of the duplicated circuit arrangement of FIG. 2.

The duplicated circuit arrangement 50 shown in FIG. 3 is basically comprised of devices 51 and 52 which are still assumed to be identical. Device 51 includes a processing element 53 working, for instance, on a P bit word (e.g. four bytes), one send/receive circuit 54, one receive circuit 55, one compare circuit 56 and lastly a multiplexer 57. Processing element 53 is still comprised of two sections, each of P/2 bits. The MSB section handles the MSB's (Most Significant Bits) and the LSB section handles the LSB's (Less Significant Bits). Send/receive circuit 54 assures bidirectional transmission of the MSB's or the LSB's to and from processing element 53, on bus 58 and on either bus 59 or 60. On the other hand, send/receive circuit 54 assures a bidirectional transmission with the main processor 61 via bus 62 which is connected in parallel with bus 63 of the main processor 61. As it will become apparent later, bus 63 handles either the MSB's or the LSB's. The selection between the MSB's or the LSB's to be sent by send-/receive circuit 54 is made by multiplexer 57 under control of the main processor 61 through control line M1. The send/receive circuit 54 operates either in the SEND mode or in the RECEIVE mode under the control of the main processor 61 through control line SR13. It operates in the RECEIVE mode when the drivers are set in the high impedance state.

Receive circuit 55 receives data (either the MSB's or the LSB's) from data busses 64 and 65 and transmits them to the processing element 53 first through bus 66A then through either bus 59 or through bus 60 depending the action of multiplexer 57.

Compare circuit 56 compares the data (MSB's or LSB's) generated by processing element 53 on its internal bus 66B with corresponding data generated by the processing element of device 52 available on bus 66A. Busses 62 and 65 constitute data bus 67 of device 51.

Device 52 is structurally identical to device 51. Device 52 includes a processing element 68, one send-/receive circuit 69, one receive circuit 70, one compare circuit 71 and lastly a multiplexer 72. Send/receive circuit 69 assures bidirectional transmission of the MSB's or the LSB's to and from processing element 68, on bus 73 and either bus 74 or 75. On the other hand send/receive circuit 69 assures a bidirectional transmission with the main processor 61 via bus 76 which is connected in parallel with bus 64 of the main processor 61. The selection between the MSB's or the LSB's to be sent by send/receive circuit 69 is made by multiplexer 72 under control of the main processor 61 through control line M2. The send/receive circuit 69 operates either in the SEND mode or, in the RECEIVE mode, under the control of the main processor 61 through control line SR23. Receive circuit 70 receives data (either the MSB's or the LSB's) from data busses 63 and 77 and transmits them to the processing element 68 first through bus 78A then either through bus 74 or 75 depending the action of multiplexer 72.

Compare circuit 71 compares the data (MSB's or LSB's) generated by processing element 68 on an internal bus 78B with corresponding data generated by processing element 53 of device 51 available on bus 78A. Busses 76 and 77 constitute bus 79 of device 52. The outputs of compare circuits 56 and 71 are AND dotted at node 80 and provide the CHKOUT bit on line 81 for the main processor 61.

Halves of devices 51 and 52 are no longer symmetrical.

In the main processor 61, there is also a multiplexer referenced 82. Data busses 63 and 64 constitute the main data bus 83 of the main processor.

It is apparent from FIG. 3, that the number of controlled driver/receiver units and that of compare circuits is divided by two, compared with the arrangement shown in FIG. 2, at the minor expense of additional multiplexing circuitry and of simple standard receivers. It is to be noted that multiplexers 57 and 72 orient the MSB and LSB outputs of the processing elements 53 and 68 to the adequate send/receive circuits so that the subject circuit arrangement of FIG. 3 has outstanding flexible capabilities. A same type of multiplexer referenced 82 is implemented in the main processor 61 to switch the bus lines 63 and 64 to the adequate processor lines.

Normal operation of the duplicated circuit arrangement of FIG. 3 is the following:
(a) Main processor 61 sets send/receive circuits 54 and 69 of device 51 and device 52 respectively, to the RECEIVE mode via SR13 and SR23. In addition, it selects the appropriate multiplexer positions, via M1 and M2, (1) to connect the outputs of receivers of send/receive circuit 54 of device 51 to the MSB section of processing element 53 and the outputs of the send/receive circuit 69 of device 52 to the LSB section of processing element 68, and (2) to connect the outputs of the receivers of receive circuits 55 and 70 to LSB section of processing element 53 and to MSB section of processing element 68. Therefore, all the data bits are sent from the main processor 61 to device 51 and device 52.
(b) Processing elements 53 and 68 of devices 51 and 52 process the data.
(c) Main processor sets send/receive circuits 54 and 69 of device 51 and device 52 to the SEND mode and keeps the multiplexer's positions in same state as in step a). Device 51 and device 52 send processed MSB's and LSB's to main processor 61 through send/receive circuits 54 and 69 operating in the SEND mode respectively. On the other hand, device 51 and device 52 receive LSB's and MSB's respectively from receive circuits 55 and 70 operating in the RECEIVE mode. LSB's are compared in compare circuit 56 while MSB's are compared in compare circuit 71. Because during this step, receive circuits 55 and 70 also allow the compare function, this mode will be referenced as to the RECEIVE/COMPARE mode.

This latter step constitutes the TRANSMISSION step of the system.

Any miscompare detection is sent to the main processor 61 that stops the task in progress and starts a diagnosis routine to detect which one of the two processing element has a failure and which part or section (MSB or LSB) of it is concerned. Then it takes corrective action to reconfigure the task according to the diagnostic results.

If only one section of a processing element is found defective, this section is disconnected from the send-/receive circuit via the multiplexor matrix (if previously connected) and replaced with the other half. The multiplexer of the other device is adequately operated to switch the remaining bits to its send/receive circuit. Processing can keep going on at the same speed but without checking on the defective device until repair.

If a device (e.g. 51) is found defective on both sections, it is completely disabled: send/receive circuit (e.g. 54) is put in a HIGH IMPEDANCE mode by setting its drivers in a high impedance state and by inhibiting the compare circuit (e.g. 56) of the defective device. The system operates then in the so called "degraded operation". Processing can continue with the other one at reduced speed without checking until repair: MSB's and LSB's are alternately switched to the send/receive circuit by the multiplexer matrix under the control of the main processor through line M1 or M2. The send/receive circuit operates in a so called S seq S mode, to indicate that the LSB section and the MSB section are sequentially connected to the send/receive circuit by shifted clock pulses. Adequate multiplexing also takes place in the main processor since only one half of bus 83 is used to transmit data.

TABLE 2 shows the tasks allocated by the main processor 61 to devices 51 and 52 through the operating modes of send/receive circuits and multiplexer during the TRANSMISSION step, depending on the section of the processing element (P.E.) where the failure is located.

TABLE 2

| DEVICE 51 | | DEVICE 52 | | |
|---|---|---|---|---|
| MSB Sect. mode | LSB Sect. | MSB Sect. mode | LSB Sect. | |
| G | G | G | G | |
| S(MSB) | R/C (LSB) | S(LSB) | RC(MSB) | No fail |
| F | G | G | G | |
| S(LSB) | HI | S(MSB) | RC(LSB) | |
| G | F | G | G | |
| S(MSB) | HI | S(LSB) | RC(MSB) | half P.E. fail |
| G | G | F | G | |
| S(MSB) | RC(LSB) | S(LSB) | HI | |
| G | G | G | F | |
| S(LSB) | RC(MSB) | S(MSB) | HI | |
| F | F | G | G | |
| HI | HI | S seq S | HI | full P.E. fail (degraded operation) |
| G | G | F | F | |
| S seq S | HI | HI | HI | |

Legend:
F = Fail
G = Good
S = SEND mode
R/C = RECEIVE/COMPARE mode
S seq S = S seq S mode.
HI = HIGH IMPEDANCE mode As apparent from the above discussion with respect to FIG. 3 and TABLE 2, the maximum number of simultaneous switches during the TRANSMISSION state is still of P/2 for any of the two devices 51 and 52.

More generally, this invention is even more efficient when N is larger than 2, for example 3 in a typical implementation of a majority voting check circuit arrangement. The number of simultaneous switchings is alleviated by a bigger amount and the detection of the failing device is made simpler and faster.

We claim:

1. An improved circuit arrangement of redundant devices, including a main processor provided with a P bit main data bus, N redundant devices, and means for providing identical portions of data input sequences to at least two of said redundant devices, said N redundant devices each provided with a device data bus, a processing element for processing a P bit word or frame in accordance with a function redundant to at least one other of said redundant devices, and receiving means connected between the inputs of the processing element and the lines of the device data bus, said device data bus being connected to said P bit main data bus, said circuit characterized in that: at least two said redundant devices are provided with driving means connected between the outputs of the processing element and the lines of the device data bus and are connected to share the driving function on the P bit main data bus between them, so that each device transmits only a part of the P bit word to said P bit main data bus, which part comprises a set of bits corresponding to the content of a predetermined section of its processing element, and bus connection means for assembling from said device data busses the sets of bits supplied by said at least two redundant devices so that the whole P bit word is available integrality on the P bit main data bus.

2. An improved circuit arrangement according to claim 1 characterized in that said driving means includes at least one group of drivers, said group being controlled by the main processor and dedicated to a determined section of the processing element.

3. An improved circuit arrangement according to claim 1 characterized in that said driving means includes one group of drivers and multiplexer means, both being controlled by the main processor so that said group of drivers may send the content of any section of the processing element.

4. An improved circuit arrangement of N redundant devices, including a main processor provided with a P bit main data bus and means for providing data to at least two of said N redundant devices wherein said data includes certain data bit sequences therein that are identical, said arrangement characterized in that each device is provided with a processing element for processing data in accordance with a function which is identical to at least one other of said redundant devices, a device data bus, and driving means connected between the outputs of the processing element and the lines of the device data bus, said driving means for said redundant devices sharing the driving function on the P bit main data bus among them, so that each device transmits on said main data bus on said main data bus part of a P bit word which comprises a set of bits corresponding to the content of a predetermined section of the processing element, and bus connection means for assemblying from said device data busses the N sets of bits supplied by the N devices so that the whole P bit word is available in integrality on the P bit main data bus.

5. An improved circuit arrangement according to claim 4 characterized in that each of said driving means comprises N groups of drivers, each group being individually controlled by the main processor and with each group being dedicated to a determined section of the processing element.

6. An improved circuit arrangement according to claim 5 further including means that during transmission of data from the processing element of a given redundant device to the main processor causes only one group of drivers in a driving means to functionally operate to send a determined set of bits, while the others are inhibited.

7. An improved circuit arrangement according to claim 6 further including means for comparing at least one other set of bits of the processing element with the corresponding set of bits in a P bit word provided by another redundant device.

8. An improved circuit arrangement according to claim 5, characterized in that N=2 and in that one section of the processing element handles the MSB's and another section of said processing element handles the LSB's .

9. An improved circuit arrangement according to claim 4 characterized in that said driving means comprises one group of P/N drivers and multiplexer means, both being controlled by the main processor, so that said group of P/N drivers may send the content of any section of the processing element.

10. An improved circuit arrangement according to claim 9 further comprising means that during transmission of data from the processing element to the main processor, sends one set of P/N bits by said group of P/N drivers while comparing at least one other set of P/N bits with the corresponding set of bits provided by another device.

11. An improved circuit arrangement according to claim 10 characterized in that N=2 and in that one section of said processing element handles the MSB's and another section of said processing element handles the LSB's.

12. An improved circuit arrangement according to claim 10 characterized in that said multiplexer means comprises a bidirectional input, output multiplexer controlled by the main processor, said multiplexer means being connected between the processing element and the group of P/N drivers to communicate either the MSB's or the LSB's to or from said group of P/N drivers.

13. An improved circuit arrangement according to claim 11 characterized in that said multiplexer means further comprises a multiplexer controlled by the main processor, said multiplexer means being connected between the main data bus and the processor bus lines to cause either the MSB's and/or the LSB's to be communicated to said main processor.

* * * * *